(12) United States Patent
Seshadri et al.

(10) Patent No.: US 11,765,034 B2
(45) Date of Patent: Sep. 19, 2023

(54) ENFORCING POLICIES IN CLOUD DOMAINS WITH DIFFERENT APPLICATION NOMENCLATURES

(71) Applicant: Juniper Networks, Inc., Sunnyvale, CA (US)

(72) Inventors: Prakash T. Seshadri, Fremont, CA (US); Sunil G. Rawoorkar, Pleasanton, CA (US); Yasmin Zarina, East Palo Alto, CA (US); Srinivas Nimmagadda, San Jose, CA (US); Jeffrey S. Marshall, Santa Clara, CA (US); Krishnaiah Gogineni, Pleasanton, CA (US); Kartik Krishnan S. Iyyer, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 223 days.

(21) Appl. No.: 16/948,623

(22) Filed: Sep. 25, 2020

(65) Prior Publication Data

US 2021/0014119 A1    Jan. 14, 2021

Related U.S. Application Data

(63) Continuation of application No. 15/934,737, filed on Mar. 23, 2018, now Pat. No. 10,819,576.

(51) Int. Cl.
*H04L 29/06*     (2006.01)
*H04L 41/0893*   (2022.01)
(Continued)

(52) U.S. Cl.
CPC ........ *H04L 41/0893* (2013.01); *G06F 9/5072* (2013.01); *G06F 9/54* (2013.01);
(Continued)

(58) Field of Classification Search
CPC ... H04L 41/0893; H04L 63/20; H04L 63/102; H04L 63/104; G06F 9/54; G06F 9/5072
See application file for complete search history.

(56) References Cited

U.S. PATENT DOCUMENTS

2003/0229501 A1   12/2003   Copeland et al.
2011/0090911 A1   4/2011    Hao et al.
(Continued)

FOREIGN PATENT DOCUMENTS

| CN | 105991738 A | 10/2016 |
| CN | 107465681 A | 12/2017 |
| CN | 107547258 A | 1/2018 |

OTHER PUBLICATIONS

Extended European Search Report for Application No. EP19163253.8, dated Aug. 22, 2019, 10 pages.

*Primary Examiner* — Dao Q Ho
(74) *Attorney, Agent, or Firm* — Harrity & Harrity, LLP

(57) ABSTRACT

A device receives policy information indicating a policy to be implemented for an application hosted by multiple cloud domains, and receives, from the multiple cloud domains, different application resource tags and addresses associated with the application. The device maps the different application resource tags to a generic identifier, and associates the policy with the generic identifier and with the addresses associated with the application. The device provides, based on associating the policy with the generic identifier and with the addresses associated with the application, the policy to the multiple cloud domains to permit the multiple cloud domains to implement the policy.

20 Claims, 10 Drawing Sheets

(51) Int. Cl.
*H04L 9/40* (2022.01)
*G06F 9/50* (2006.01)
*G06F 9/54* (2006.01)
*H04L 41/16* (2022.01)

(52) U.S. Cl.
CPC .......... *H04L 63/102* (2013.01); *H04L 63/104* (2013.01); *H04L 63/20* (2013.01); *H04L 41/16* (2013.01)

(56) References Cited

U.S. PATENT DOCUMENTS

| | | |
|---|---|---|
| 2012/0222106 A1 | 8/2012 | Kuehl |
| 2013/0031158 A1* | 1/2013 | Salsburg ............... G06F 9/5077 709/203 |
| 2014/0173694 A1 | 6/2014 | Kranz |
| 2014/0330974 A1 | 11/2014 | Labocki |
| 2015/0007197 A1* | 1/2015 | Tripp .................... G06F 9/5072 718/106 |
| 2017/0126743 A1 | 5/2017 | Bryan et al. |
| 2017/0201569 A1 | 7/2017 | Fu et al. |
| 2019/0173907 A1* | 6/2019 | Kras ................... H04L 63/1433 |
| 2019/0296978 A1 | 9/2019 | Seshadri et al. |

* cited by examiner

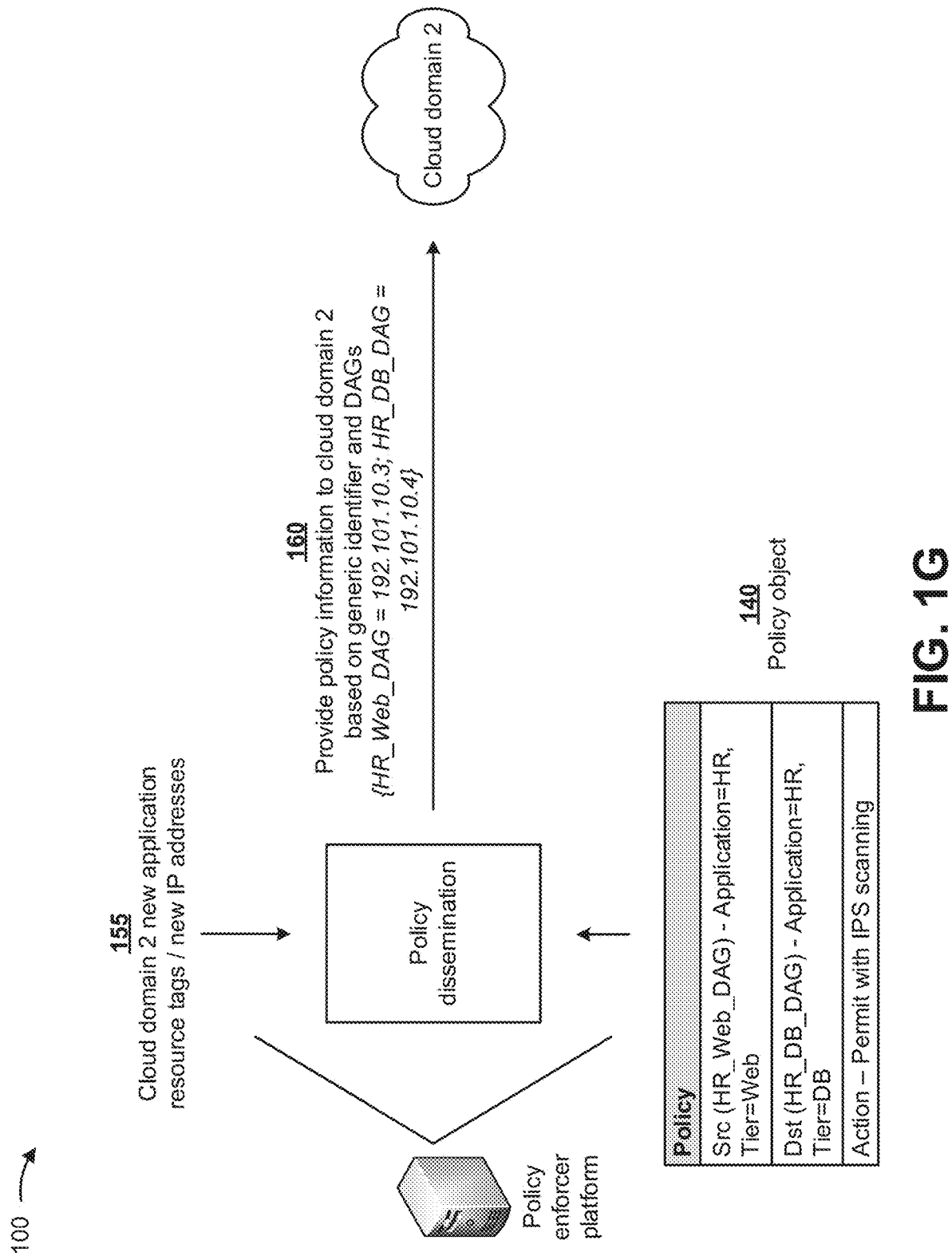

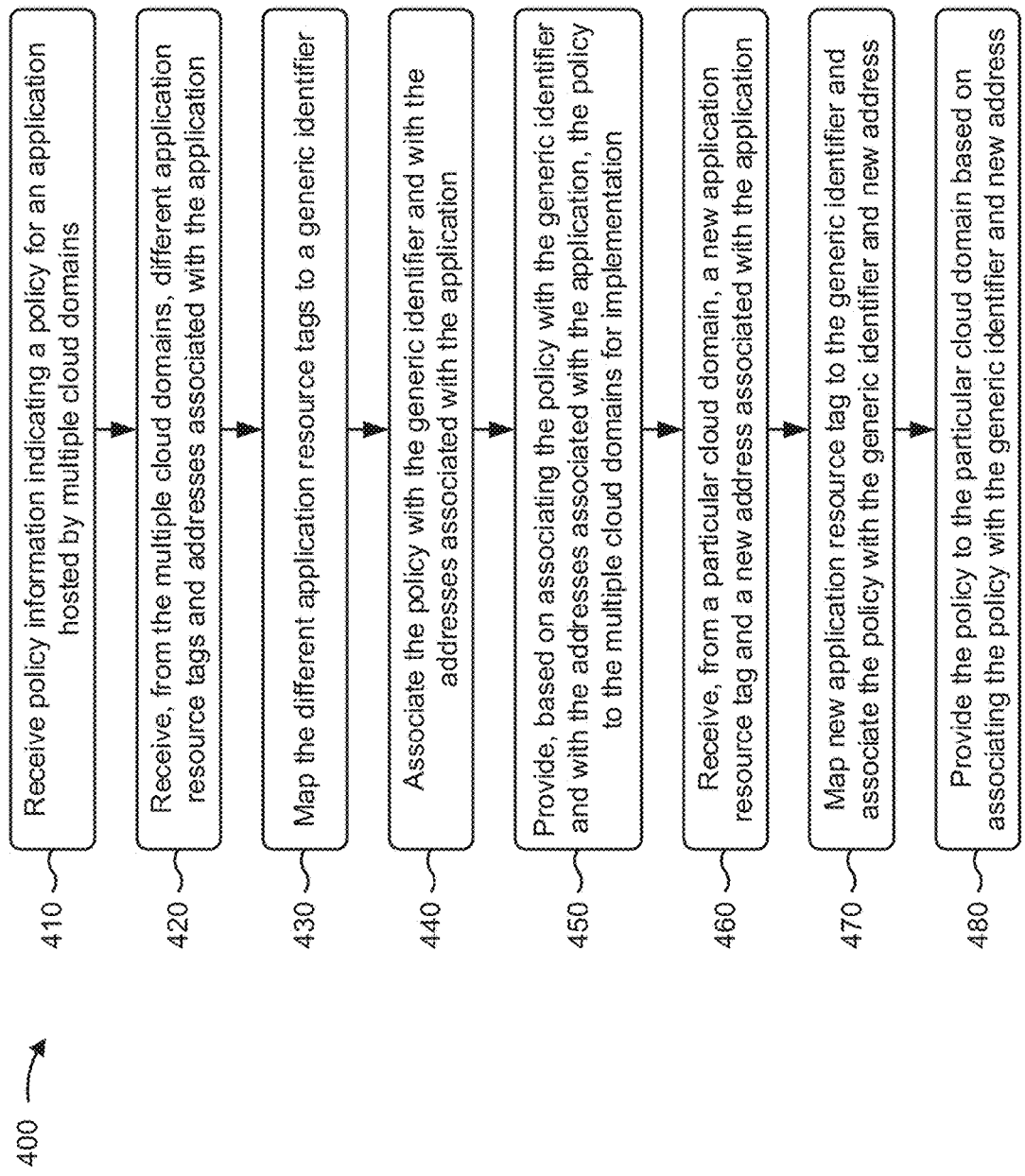

ENFORCING POLICIES IN CLOUD DOMAINS WITH DIFFERENT APPLICATION NOMENCLATURES

RELATED APPLICATION

This application is a continuation of U.S. patent application Ser. No. 15/934,737, filed Mar. 23, 2018, which is incorporated herein by reference.

BACKGROUND

Enterprises are migrating more and more applications, from traditional legacy data centers, to cloud computing environments, such as public cloud domains (e.g., Amazon® Web Services (AWS), Microsoft® Azure, Google® Cloud, etc.), private cloud domains (e.g., intranets, VMware®, OpenStack®, etc.) and/or the like. The cloud computing environments are more cost efficient and optimize resource allocations better than legacy data centers.

SUMMARY

According to some implementations, a device may include one or more memories, and one or more processors to receive policy information indicating a policy to be implemented for an application hosted by a plurality of cloud domains. The one or more processors may receive, from the plurality of cloud domains, different application resource tags and addresses associated with the application, and may map the different application resource tags to a generic identifier. The one or more processors may associate the policy with the generic identifier and with the addresses associated with the application, and may provide, based on associating the policy with the generic identifier and with the addresses associated with the application, the policy to the plurality of cloud domains to permit the plurality of cloud domains to implement the policy.

According to some implementations, a non-transitory computer-readable medium may store instructions that include one or more instructions that, when executed by one or more processors, cause the one or more processors to receive information indicating a policy to be implemented for an application hosted by a first cloud domain and a second cloud domain separate from the first cloud domain. A third cloud domain is separate from the first cloud domain and the second cloud domain, is associated with the first cloud domain and the second cloud domain, and does not host the application. The one or more instructions may cause the one or more processors to receive, from the first cloud domain and the second cloud domain, different application resource tags and addresses associated with the application, and map the different application resource tags to a generic identifier. The one or more instructions may cause the one or more processors to associate the policy with the generic identifier and with the addresses associated with the application, and provide, based on associating the policy with the generic identifier and with the addresses associated with the application, the policy to the first cloud domain and the second cloud domain to permit the first cloud domain and the second cloud domain to implement the policy. The one or more instructions may cause the one or more processors to prevent the policy from being provided to the third cloud domain based on the third cloud domain not hosting the application.

According to some implementations, a method may include receiving, by a device, information indicating a policy to be implemented for an application hosted by a private cloud domain and a public cloud domain, and receiving, by the device and from the private cloud domain and the public cloud domain, different application resource tags and addresses associated with the application. The method may include mapping, by the device, the different application resource tags to a generic identifier, and associating, by the device, the policy with the generic identifier and with the addresses associated with the application. The method may include providing, by the device and based on associating the policy with the generic identifier and with the addresses associated with the application, the policy to the private cloud domain and the public cloud domain to permit the private cloud domain and the public cloud domain to implement the policy in association with the application.

BRIEF DESCRIPTION OF THE DRAWINGS

FIGS. 1A-1G are diagrams of an overview of an example implementation described herein;

FIG. 4 is a flow chart of an example process for enforcing policies in cloud domains with different application nomenclatures.

DETAILED DESCRIPTION

The following detailed description of example implementations refers to the accompanying drawings. The same reference numbers in different drawings may identify the same or similar elements.

With enterprises migrating hundreds, thousands, millions, etc. of applications to cloud domains, enterprise or network administrators increasingly deal with the complexities of utilizing policies (e.g., business policies, security policies, network policies, and/or the like) to manage the applications migrated to the cloud domains. For example, each cloud domain typically defines unique support and requirements for network administrators that provision the applications and define policies for the applications.

The different cloud domains utilize inconsistent and different nomenclatures associated with how applications are classified and provisioned, and how policies are defined for applications. Thus, network administrators are faced with managing a variety of different nomenclatures that are not portable across different cloud domains. This creates confusion for the network administrators and causes duplication of applications and/or policies in one or more cloud domains, omission of applications and/or policies in one or more cloud domains, and/or the like. Such an arrangement also requires manual migration of applications from one cloud domain (e.g., a public cloud domain) to another cloud domain (e.g., a private cloud domain).

Some implementations described herein provide a policy enforcer platform that enforces policies in cloud domains with different application nomenclatures. For example, the policy enforcer platform may receive policy information indicating a policy for an application hosted by multiple cloud domains, and may receive, from the multiple cloud domains, different application resource tags and addresses associated with the application. The policy enforcer platform may map the different application resource tags to a generic identifier, and may associate a policy with the generic identifier and with the addresses associated with the application. The policy enforcer platform may provide, based on associating the policy with the generic identifier and with the addresses associated with the application, the policy to the multiple cloud domains to permit the multiple cloud domains to implement the policy.

Figure 1A:
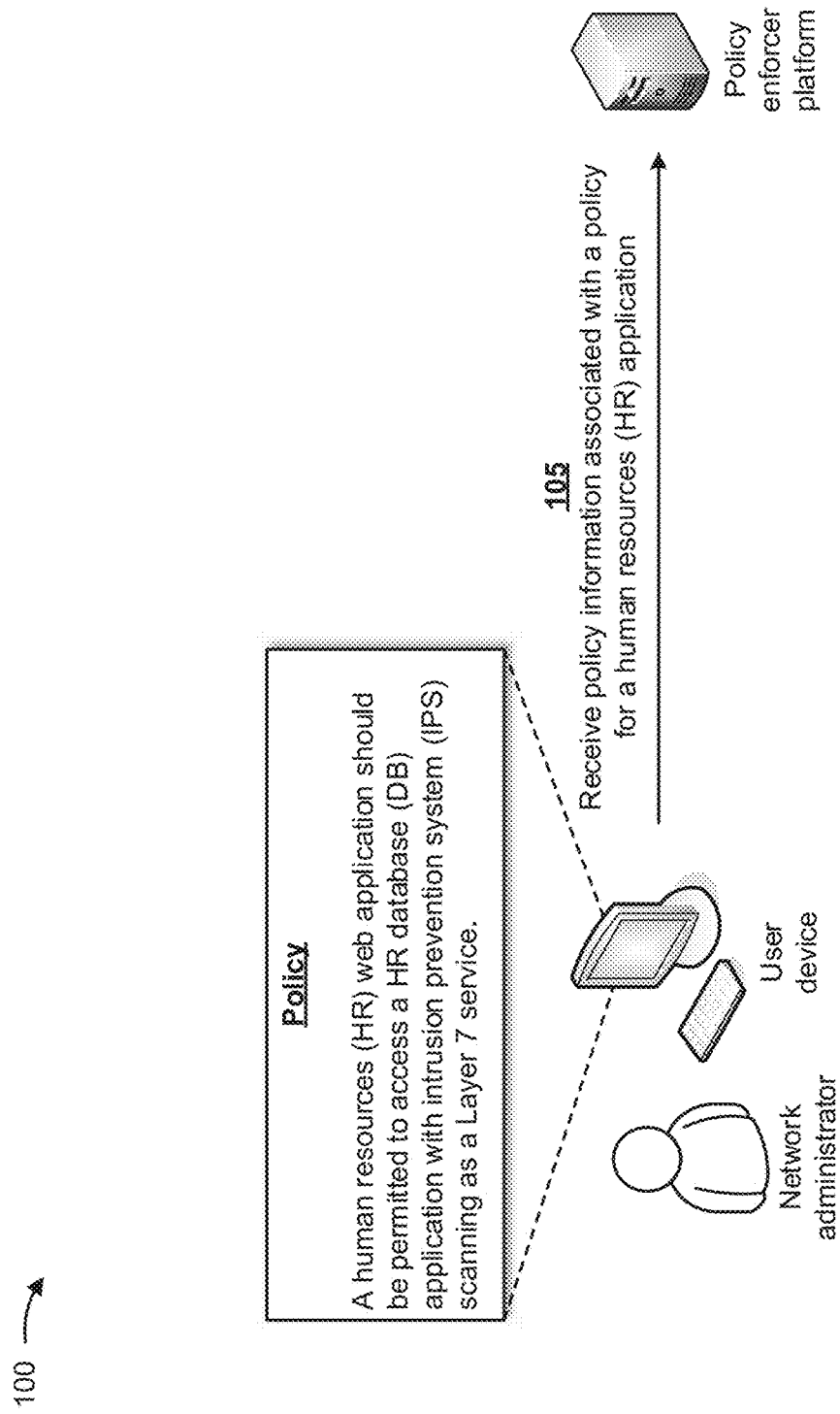

FIGS. 1A-1G are diagrams of an overview of an example implementation 100 described herein. As shown in FIG. 1A, a user device may be associated with a network administrator and a policy enforcer platform. As further shown in FIG. 1A, the network administrator (e.g., via a user interface provided by the user device to the network administrator) may provide, to the user device, policy information associated with a policy for a human resources (HR) application. For example, as shown in FIG. 1A, the policy may indicate that the "human resources (HR) web application should be permitted to access a HR database (DB) application with intrusion prevention system (IPS) scanning as a Layer 7 service." In some implementations, the policy may include a security policy (e.g., a firewall policy, an intrusion detection system (IDS) policy, an IPS policy, and/or the like) to be applied to an application, a business policy (e.g., a record retention policy, a data access policy, and/or the like) to be applied to an application, a network policy (e.g., a network authorization policy, an ingress policy, an egress policy, and/or the like) to be applied to an application, combinations of policies to be applied to an application, and/or the like. In some implementations, the policy may include one or more network security firewall policies that define rules indicating permitted communications between source applications and destination applications (e.g., to provide a business solution), advanced security services for the communications (e.g., IPS, IDS, etc.), and/or the like.

As further shown in FIG. 1A, and by reference number 105, the network administrator may cause the user device to provide the policy information to the policy enforcer platform, and the policy enforcer platform may receive the policy information from the user device. In some implementations, the policy enforcer platform may receive policy information from one or more sources other than the user device. For example, the policy enforcer platform may receive policy information, associated with other applications, from one or more other user devices associated with other network administrators, other personnel associated with the other applications, and/or the like.

Figure 1B:
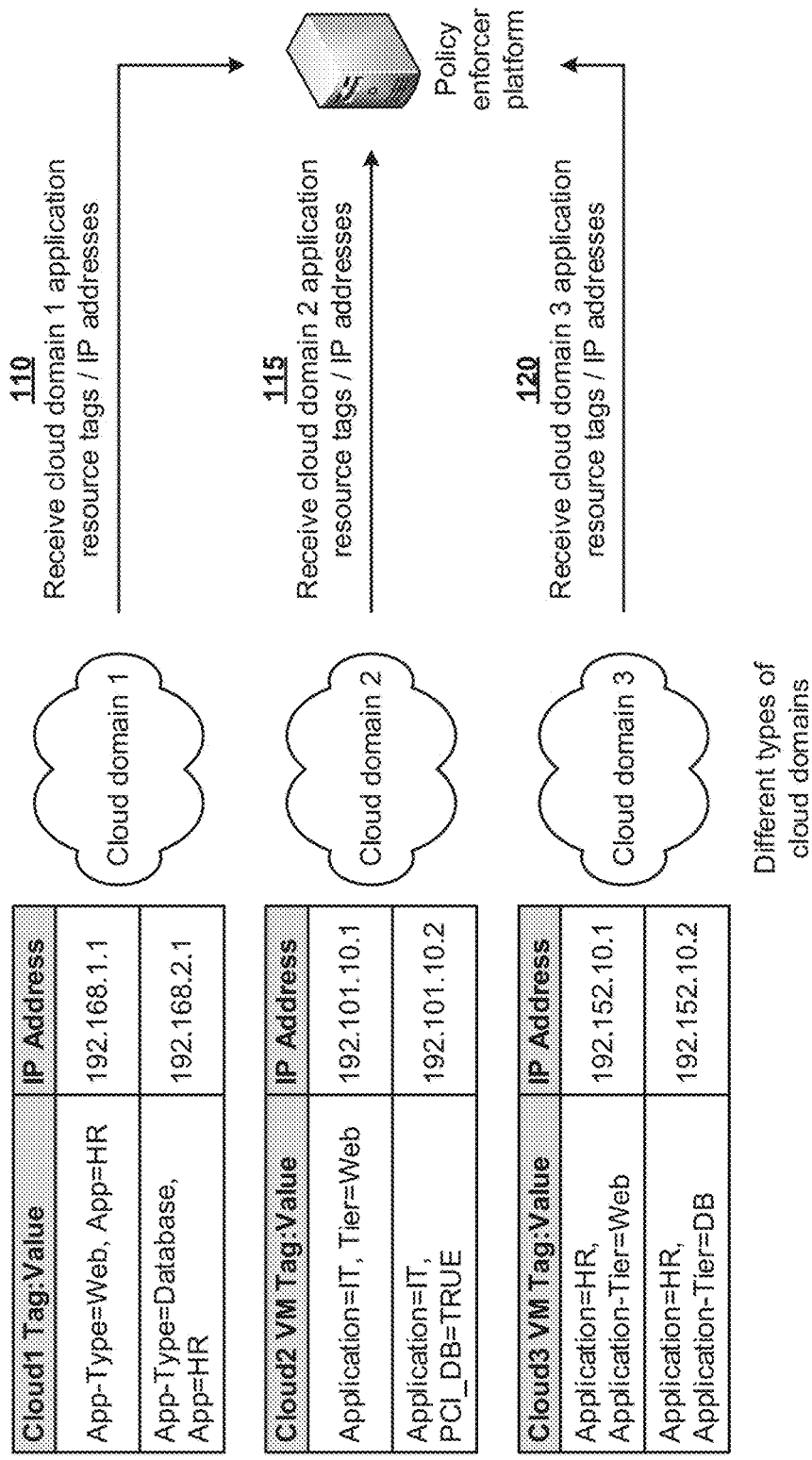

As shown in FIG. 1B, the policy enforcer platform may be associated with different types of cloud domains, such as a first cloud domain (e.g., cloud domain 1), a second cloud domain (e.g., cloud domain 2), and a third cloud domain (e.g., cloud domain 3). In some implementations, each of the different cloud domains may include a private cloud domain, a public cloud domain, a legacy data center domain, and/or the like. As further shown, the first cloud domain may include nomenclature (e.g., application resource tags) for identifying applications, and Internet protocol (IP) addresses associated with the applications. For example, for the HR application, the first cloud domain may include an application resource tag (App-Type) to identify a type associated with the HR application (e.g., a web application), an application resource tag (App) to identify the HR web application, an application resource tag (App-Type) to identify another type associated with the HR application (e.g., a database application), and an application resource tag (App) to identify the HR database application. The first cloud domain may include an IP address (e.g., 192.168.1.1) associated with the HR web application and an IP address (e.g., 192.168.2.1) associated with the HR database application.

As further in FIG. 1B, the second cloud domain may include nomenclature for identifying applications, and IP addresses associated with the applications. For example, for an information technology (IT) application, the second cloud domain may include an application resource tag (Tier) to identify a type associated with the IT application (e.g., a web application), an application resource tag (Application) to identify the IT web application, an application resource tag (PCI DB) to identify another type associated with the IT application (e.g., a database application), and an application resource tag (Application) to identify the IT database application. The second cloud domain may include an IP address (e.g., 192.101.10.1) associated with the IT web application and an IP address (e.g., 192.101.10.2) associated with the IT database application.

As further shown in FIG. 1B, the third cloud domain may include nomenclature for identifying applications, and IP addresses associated with the applications. For example, for the HR application, the third cloud domain may include an application resource tag (Application-Tier) to identify a type associated with the HR application (e.g., a web application), an application resource tag (Application) to identify the HR web application, an application resource tag (Application-Tier) to identify another type associated with the HR application (e.g., a database (DB) application), and an application resource tag (Application) to identify the HR database application. The third cloud domain may include an IP address (e.g., 192.152.10.1) associated with the HR web application and an IP address (e.g., 192.152.10.2) associated with the HR database application.

In some implementations, each of the different cloud domains may utilize unique nomenclatures to describe a same application (e.g., the HR application). In some implementations, each of the different cloud domains may utilize nomenclatures other than application resource tags, such as metadata, numeric identifiers, and/or the like.

As further shown in FIG. 1B, and by reference number 110, the first cloud domain may provide the application resource tags and the IP addresses, associated with the first cloud domain (e.g., identifying the HR web application and the HR database application), to the policy enforcer platform, and the policy enforcer platform may receive the application resource tags and the IP addresses associated with the first cloud domain. In some implementations, the policy enforcer platform may store the application resource tags and the IP addresses, associated with the first cloud domain, in a data structure (e.g., a database, a table, a linked list, and/or the like) associated with the policy enforcer platform.

As further shown in FIG. 1B, and by reference number 115, the second cloud domain may provide the application resource tags and the IP addresses, associated with the second cloud domain (e.g., identifying the IT web application and the IT database application), to the policy enforcer platform, and the policy enforcer platform may receive the application resource tags and the IP addresses associated with the second cloud domain. In some implementations, the policy enforcer platform may store the application resource tags and the IP addresses, associated with the second cloud domain, in the data structure associated with the policy enforcer platform.

As further shown in FIG. 1B, and by reference number 120, the third cloud domain may provide the application resource tags and the IP addresses, associated with the third cloud domain (e.g., identifying the HR web application and the HR database application), to the policy enforcer platform, and the policy enforcer platform may receive the application resource tags and the IP addresses associated with the third cloud domain. In some implementations, the policy enforcer platform may store the application resource tags and the IP addresses, associated with the third cloud domain, in the data structure associated with the policy enforcer platform.

In some implementations, the policy enforcer platform may dynamically determine information identifying resources (e.g., tenants, subnets, virtual networks, applications, application resource tags, application IP addresses, virtual machines, and/or the) associated with the different cloud domains, and may store the information in the data structure.

Figure 1C:
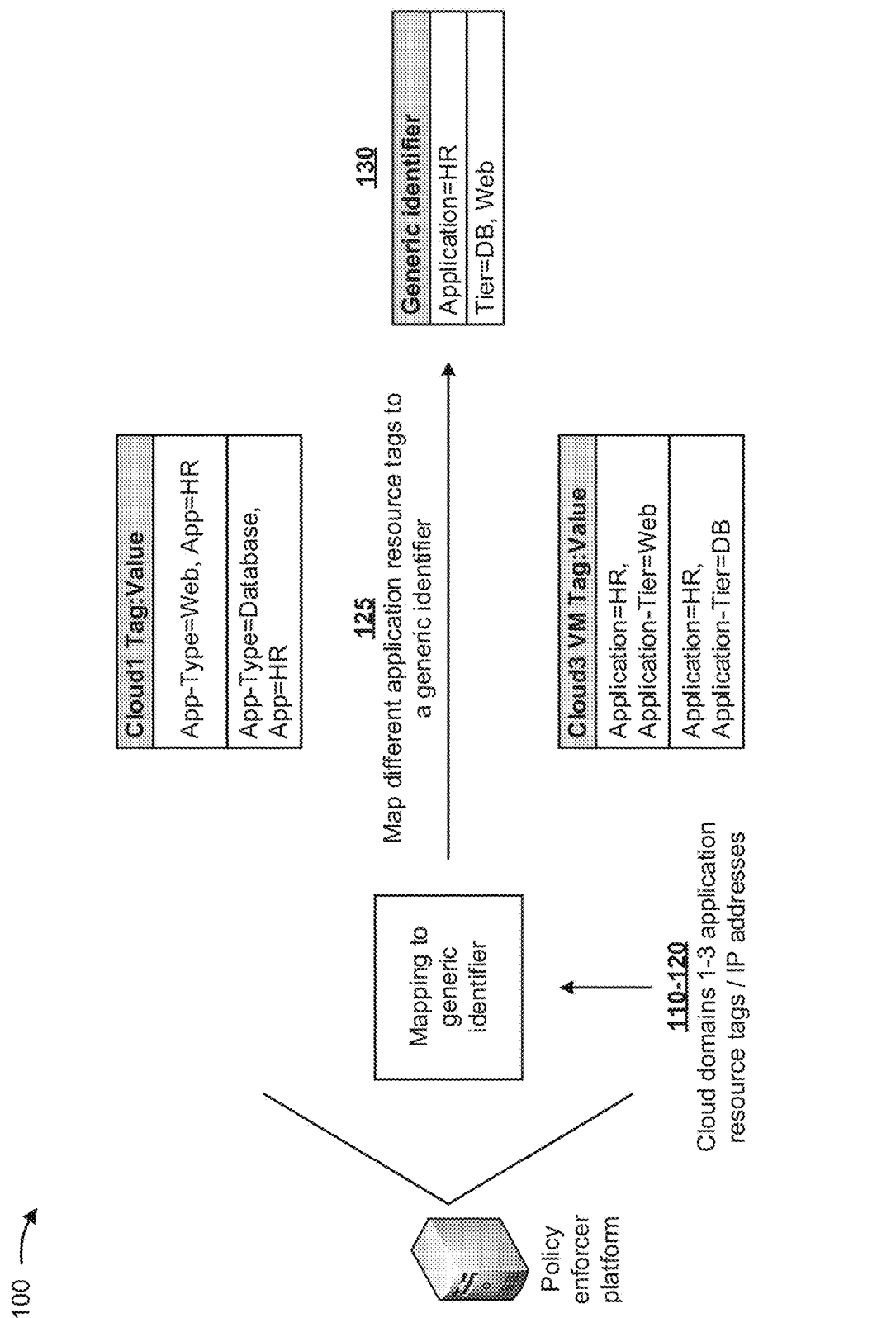

As shown in FIG. 1C, and by reference numbers 110, 115, 120, and 125, the policy enforcer platform may map different application resource tags (e.g., the application resource tags associated with the first cloud domain and the third cloud domain), associated with the HR application, to a generic identifier that identifies the HR application. In some implementations, the policy enforcer platform may not map the application resource tags, associated with the second cloud domain, to the generic identifier since the application resource tags associated with the second cloud domain relate to the IT application and not the HR application.

As further shown in FIG. 1C, and by reference number 130, the generic identifier may include a first field or tag (Application) to identify the HR application and second field or tag (Tier) to identify types associated with the HR application (e.g., a web application and a database application). In some implementations, the generic identifier may provide a common nomenclature for the HR application that maps to the different nomenclatures utilized by the first cloud domain and the third cloud domain to identify the HR application.

In some implementations, prior to mapping the different application resource tags to the generic identifier, the policy enforcer platform may process the different application resource tags, with a natural language processing technique, a computational linguistics technique, a text analysis technique, and/or the like, to determine which of the different application resource tags relate to the HR application and are to be mapped to the generic identifier.

In some implementations, the policy enforcer platform may apply natural language processing to interpret the different application resource tags and to generate additional information associated with a potential meaning of information within the different application resource tags. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the policy enforcer platform may utilize a computational linguistics technique with the different application resource tags. The computational linguistics technique may include a technique that applies computational linguistics to interpret the different application resource tags and to generate additional information associated with a potential meaning of information within the different application resource tags. Computational linguistics includes techniques for understanding written and spoken language from a computational perspective, and building artifacts that process and produce language.

In some implementations, the policy enforcer platform may utilize a text analysis technique with the different application resource tags. The text analysis technique may include a technique that applies text analysis to interpret the different application resource tags and to generate additional information associated with a potential meaning of information within the different application resource tags. Text analysis may include parsing text in order to extract facts from the text, and creating sets of structured data. Text analysis (e.g., content analysis) may include systematic reading or observation of text or artifacts which are assigned labels to indicate a presence of interesting, meaningful patterns, allowing for statistical estimation of proportions of patterns in the text, as well as correlations between patterns.

In some implementations, prior to mapping the different application resource tags to the generic identifier, the policy enforcer platform may process the different application resource tags, with one or more artificial intelligence models, to determine which of the different application resource tags relate to the HR application and are to be mapped to the generic identifier. In some implementations, the one or more artificial intelligence models may include one or more of a support vector machine model, an artificial neural network model, a data mining model, a pattern discovery model, and/or the like.

A support vector machine model may include a supervised learning model with one or more associated learning algorithms that analyze data used for classification and regression analysis. Given a set of training examples, each training example being marked as belonging to one or the other of two categories, a training method of the support vector machine model builds a model that assigns new examples to one category or the other. The support vector machine model is a representation of examples as points in space, mapped so that the examples of separate categories are divided by a clear gap that is as wide as possible. New examples are then mapped into that same space and predicted to belong to a category based on which side of the gap the new examples fall.

An artificial neural network model may include a model that uses an artificial neural network (e.g., to determine which of the different application resource tags relate to the HR application). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which the artificial neuron is connected. Artificial neurons and connections typically have a weight that adjusts as learning proceeds. The weight may increase or decrease the strength of the signal at a connection. Additionally, an artificial neuron may have a threshold such that the artificial neuron sends a signal only if the aggregate signal satisfies the threshold. Typically, artificial neurons are organized in layers, and different layers may perform different kinds of transformations on their inputs.

A data mining model may include a model that performs anomaly detection (e.g., outlier, change, and/or deviation detection) to identify unusual data records of interest or data errors that require further investigation, association rule learning (e.g., dependency modeling) to search for relationships between variables, clustering to discover groups and/or structures in data that are similar without using known structures in the data, classification to generalize a known structure to apply to new data, regression to identify a function that models the data with the least error, summarization to provide a more compact representation of the data set, including visualization and report generation, and/or the like.

A pattern discovery model may include a data mining technique, such as sequential pattern mining. Sequential pattern mining is a type of structured data mining that seeks to identify statistically relevant patterns between data examples where the values are delivered in a sequence. Sequential pattern mining may be classified as string mining (e.g., which is based on string processing models), and/or item set mining (e.g., which is based on association rule learning). String mining deals with a limited alphabet for items that appear in a sequence, but where the sequence itself may be very long. Item set mining deals with discovering frequent item sets, and an order in which the frequent item sets appear.

In some implementations, the policy enforcer platform may utilize one or more of the artificial intelligence models, and may utilize best results determined by one of the artificial intelligence models. In some implementations, the policy enforcer platform may utilize a plurality of the artificial intelligence models, and may aggregate the results determined by the plurality of artificial intelligence models.

In some implementations, the policy enforcer platform may map information identifying all applications (e.g., application resource tags and IP addresses) associated with the different cloud domains with generic identifiers, in the manner described above.

In some implementations, the policy enforcer platform may enable a network administrator to override a mapping to the generic identifier based on information defined by the network administrator. In such implementations, the policy enforcer platform may provide a user interface (e.g., to the user device), and the user interface may enable the network administrator to provide information associated with mapping the different application resource tags to the generic identifier. The user device may provide, to the policy enforcer platform, the information associated with mapping the different application resource tags to the generic identifier, and the policy enforcer platform may receive the information associated with mapping the different application resource tags to the generic identifier. The policy enforcer platform may map the different application resource tags to the generic identifier based on the information associated with mapping the different application resource tags to the generic identifier.

Figure 1D:
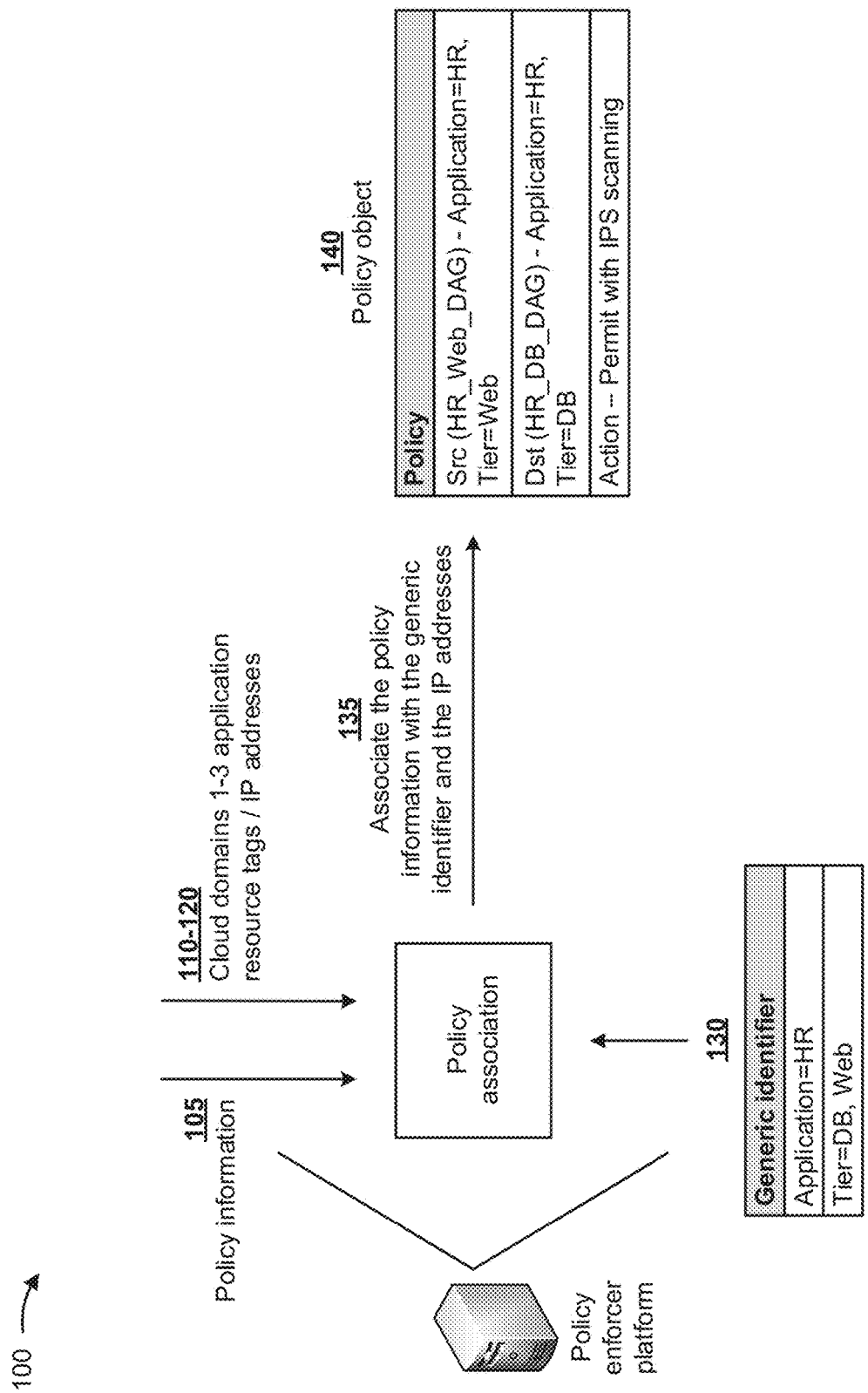

As shown in FIG. 1D, and by reference numbers 105, 110, 115, 120, 130, and 135, the policy enforcer platform may associate the policy information with the generic identifier and with the IP addresses associated with the HR application (e.g., the IP addresses associated with the first cloud domain and the third cloud domain). In some implementations, when associating the policy information with the generic identifier and with the IP addresses associated with the HR application, the policy enforcer platform may create a policy object that includes a source dynamic address group (DAG) identifier associated with source addresses of the IP addresses associated with the HR application (e.g., the IP addresses identifying the HR web application), a destination DAG identifier associated with destination addresses of the IP addresses associated with the HR application (e.g., the IP addresses identifying the HR database application), and information indicating an action to perform based on the policy information.

For example, the source DAG of the policy object may be associated with the IP addresses (e.g., 192.168.1.1 and 192.152.10.1, as shown in FIG. 1B) identifying the HR web application in the first cloud domain and the third cloud domain, respectively. In another example, the destination DAG of the policy object may be associated with the IP addresses (e.g., 192.168.2.1 and 192.152.10.2, as shown in FIG. 1B) identifying the HR database application in the first cloud domain and the third cloud domain, respectively.

In some implementations, the action of the policy object may include an action to be performed by the first cloud domain and the third cloud domain on the HR application. For example, the action may include permitting the HR web application to access the HR database application with IPS scanning as a Layer 7 service. In some implementations, the action may include a security action to be applied to an application, a business action to be applied to an application, a network action to be applied to an application, combinations of actions to be applied to an application, and/or the like.

Figure 1E:
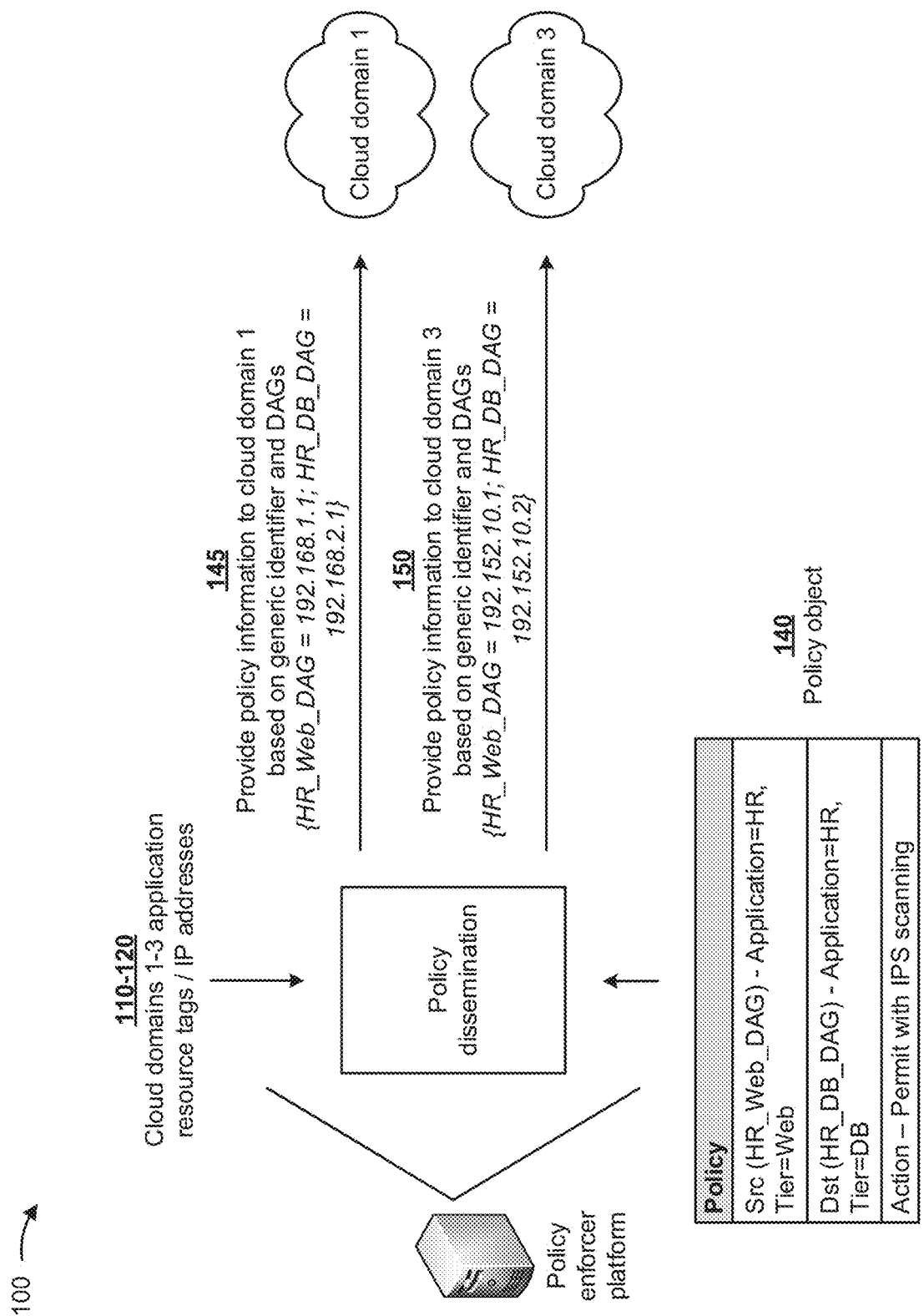

As shown in FIG. 1E, and by reference numbers 110, 115, 120, 130, 140, and 145, the policy enforcer platform may provide the policy information (e.g., the policy object) to the first cloud domain based on the generic identifier, the DAGs (e.g., provided in the policy object), and the IP addresses associated with the HR application. In some implementations, the policy enforcer platform may associate the source DAG (e.g., HR_Web_DAG) of the policy object with the IP address (e.g., 192.168.1.1) identifying the HR web application in the first cloud domain, and may associate the destination DAG (e.g., HR_DB_DAG) of the policy object with the IP address (e.g., 192.168.2.1) identifying the HR database application in the first cloud domain. The policy enforcer platform may route the policy action (e.g., "Permit with IPS scanning") to the first cloud domain, based on the source DAG and the destination DAG, to permit the first cloud domain to implement the policy action for the HR application. For example, based on the policy action, the first cloud domain may permit the HR web application to access the HR database application with IPS scanning as a Layer 7 service.

In some implementations, a DAG may include a list of IP addresses that map to a combination a common set of attributes or to common custom tag names that uniquely describe members of a group and that are identified by IP addresses associated with server devices, applications, network entities, and/or the like. In some implementations, a DAG may be applied to any network policy (e.g., a firewall policy definition), and IP address members may be dynamically determined at runtime and applied to policies without requiring a constant configuration change in the network policies. For example, HR_Web_DAG may be a classification for all applications that match "Application=HR" and "Tier=Web," and the IP addresses that form HR_Web_DAG are dynamically determined at runtime, by learning changes in the cloud domain and without resulting in a change to an original policy that was defined for HR_Web_DAG.

As further shown in FIG. 1E, and by reference numbers 110, 115, 120, 130, 140, and 150, the policy enforcer platform may provide the policy information (e.g., the policy object) to the third cloud domain based on the generic identifier, the DAGs (e.g., provided in the policy object), and the IP addresses associated with the HR application. In some implementations, the policy enforcer platform may associate the source DAG (e.g., HR_Web_DAG) of the policy object with the IP address (e.g., 192.152.10.1) identifying the HR web application in the third cloud domain, and may associate the destination DAG (e.g., HR_DB_DAG) of the policy object with the IP address (e.g., 192.152.10.2) identifying the HR database application in the third cloud domain. The policy enforcer platform may route the policy action (e.g., "Permit with IPS scanning") to the third cloud domain, based on the source DAG and the destination DAG, to permit the third cloud domain to implement the policy action for the HR application. For example, based on the policy action, the third cloud domain may permit the HR web application to access the HR database application with IPS scanning as a Layer 7 service.

In some implementations, since the second cloud domain does not include the HR application, the policy enforcer platform may not provide (e.g., may prevent) the policy information (e.g., the policy object) to the second cloud domain based on the generic identifier, the DAGs, and the IP addresses associated with the HR application.

In some implementations, if the HR application is subsequently removed from a cloud domain (e.g., the first cloud domain), the policy enforcer platform may determine, based on the application resource tags associated with the HR application, that the first cloud domain does not include the HR application anymore. In such implementations, the policy enforcer platform may cause the policy information (e.g., the policy object) to be removed from the first cloud domain based on determining that the first cloud domain does not include the HR application.

Figure 1F:
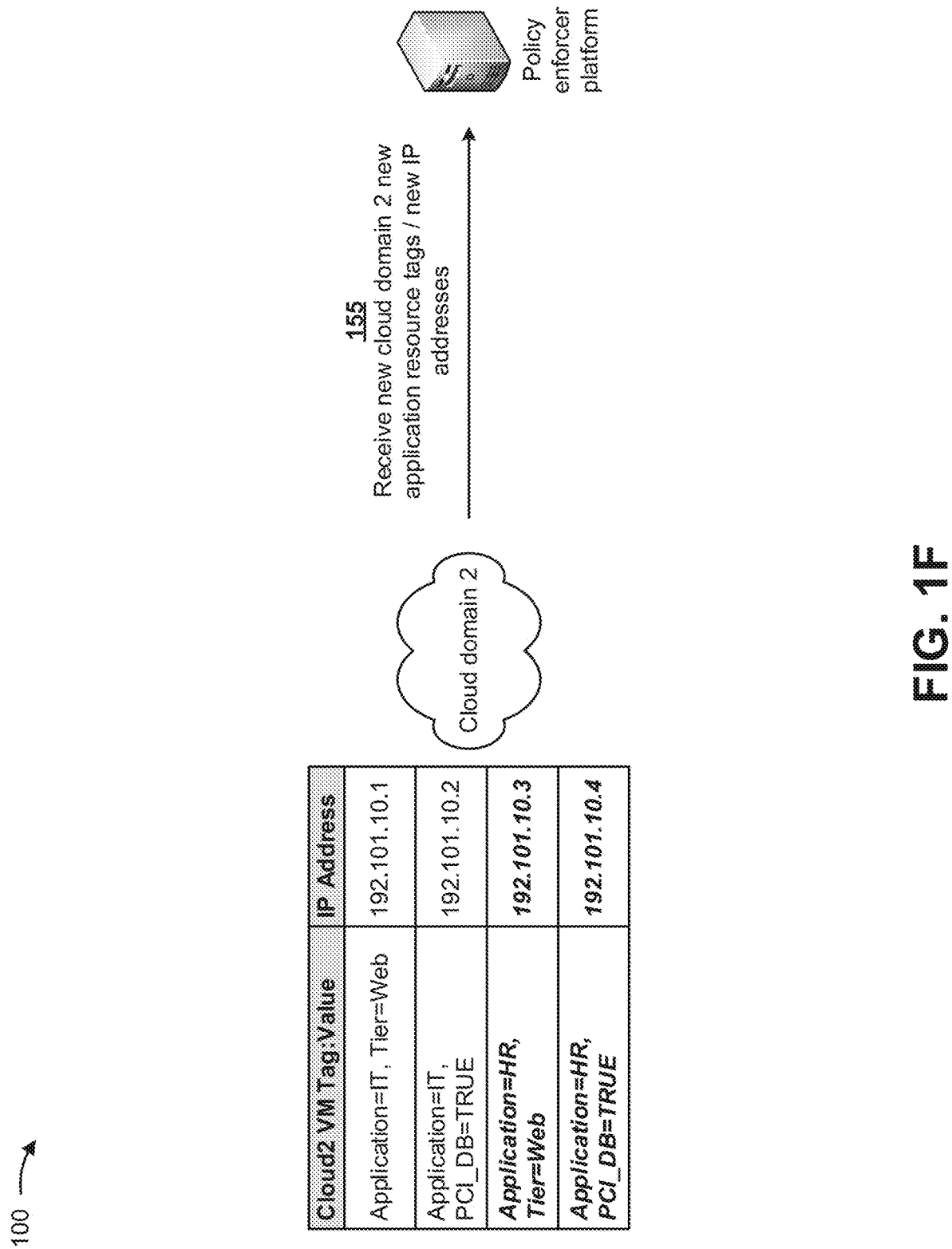

As shown in FIG. 1F, now assume that the second cloud domain includes the HR application after a period of time. For example, the HR application may be migrated from the first cloud domain to the second cloud domain, may be added to the second cloud domain without removing the HR application from the first cloud domain, and/or the like. As further shown in FIG. 1F, for the HR application, the second cloud domain may include an application resource tag (Tier) to identify a type associated with the HR application (e.g., a web application), an application resource tag (Application) to identify the HR web application, an application resource tag (PCI DB) to identify another type associated with the HR application (e.g., a database application), and an application resource tag (Application) to identify the HR database application. The second cloud domain may include an IP address (e.g., 192.101.10.3) associated with the HR web application and an IP address (e.g., 192.101.10.4) associated with the HR database application.

As further shown in FIG. 1F, and by reference number 155, the policy enforcer platform may receive, from the second cloud domain, the new application resource tags and the new IP addresses associated with the HR application. In some implementations, the policy enforcer platform may dynamically determine that the HR application is now present in the second cloud domain based on the new application resource tags and the new IP addresses associated with the HR application. In some implementations, based on dynamically determining that the HR application is now present in the second cloud domain, the policy enforcer platform may map the new application resource tags to the generic identifier for the HR application, as described elsewhere herein. In some implementations, the policy enforcer platform may associate the policy information with the generic identifier and with the new IP addresses associated with the HR application (e.g., the new IP addresses provided by the second cloud domain), as described elsewhere herein.

As shown in FIG. 1G, and by reference numbers 140, 155, and 160, the policy enforcer platform may provide the policy information (e.g., the policy object) to the second cloud domain based on the generic identifier, the DAGs (e.g., provided in the policy object), and the new IP addresses associated with the HR application. In some implementations, the policy enforcer platform may associate the source DAG (e.g., HR_Web_DAG) of the policy object with the new IP address (e.g., 192.101.10.3) identifying the HR web application in the second cloud domain, and may associate the destination DAG (e.g., HR_DB_DAG) of the policy object with the new IP address (e.g., 192.101.10.4) identifying the HR database application in the second cloud domain. The policy enforcer platform may route the policy action (e.g., "Permit with IPS scanning") to the second cloud domain, based on the source DAG and the destination DAG, to permit the second cloud domain to implement the policy action for the HR application. For example, based on the policy action, the second cloud domain may permit the HR web application to access the HR database application with IPS scanning as a Layer 7 service.

In this way, several different stages of the process for enforcing policies in cloud domains with different application nomenclatures are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to enforce policies in cloud domains with different application nomenclatures. Finally, automating the process for enforcing policies in cloud domains with different application nomenclatures conserves computing resources (e.g., processor resources, memory resources, and/or the like) that would otherwise be wasted in attempting to manage different application nomenclatures across cloud domains.

Furthermore, the policy enforcer platform may handle hundreds, thousands, millions, etc. of different applications, application nomenclatures, application addresses, and/or the like, and thus, is capable of providing a big data solution to enforcing policies in cloud domains with different application nomenclatures. The policy enforcer platform may enable network administrators to synchronize different application nomenclatures, across different cloud domains, into generic identifiers to which policies may be applied. The policy enforcer platform may enable network administrators to create, manage, monitor, and/or the like their policies for a variety of applications. The policy enforcer platform may enable policy enforcement for applications that dynamically migrate across different cloud domains.

As indicated above, FIGS. 1A-1G are provided merely as examples. Other examples are possible and may differ from what was described with regard to FIGS. 1A-1G.

Figure 2:
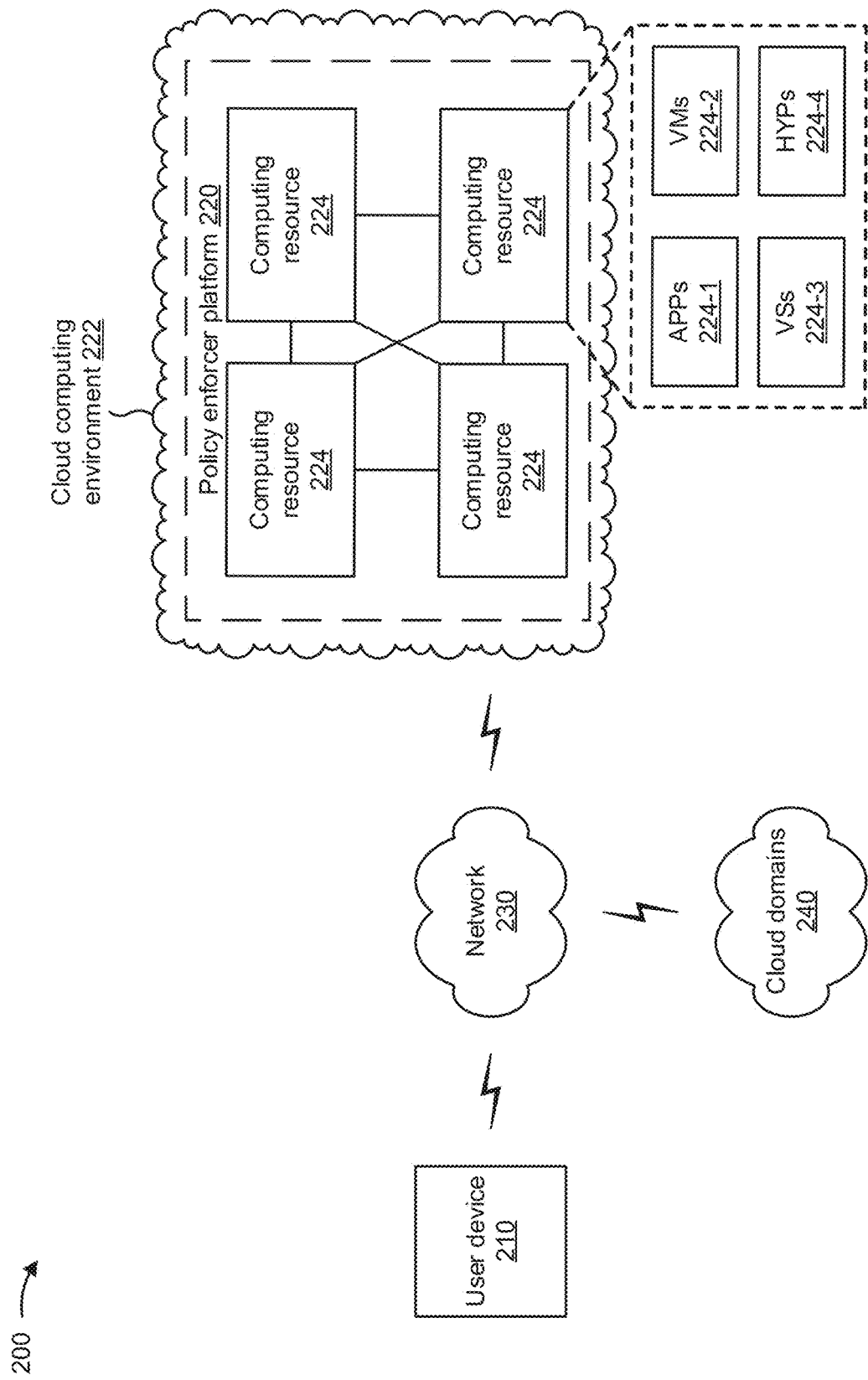
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a policy enforcer platform 220, a network 230, and cloud domains 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to policy enforcer platform 220 and/or cloud domains 240.

Policy enforcer platform 220 includes one or more devices capable of enforcing policies in cloud domains with different application nomenclatures. In some implementations, policy enforcer platform 220 may be designed to be modular such that certain software components may be swapped in or out depending on a particular need. As such, policy enforcer platform 220 may be easily and/or quickly reconfigured for different uses. In some implementations, policy enforcer platform 220 may receive information from and/or transmit information to one or more user devices 210 and/or cloud domains 240.

In some implementations, as shown, policy enforcer platform 220 may be hosted in a cloud computing environment 222. Notably, while implementations described herein describe policy enforcer platform 220 as being hosted in cloud computing environment 222, in some implementations, policy enforcer platform 220 may not be cloud-based (i.e., may be implemented outside of a cloud computing environment, such as within one or more server devices) or may be partially cloud-based.

Cloud computing environment 222 includes an environment that hosts policy enforcer platform 220. Cloud computing environment 222 may provide computation, software, data access, storage, etc. services that do not require end-user knowledge of a physical location and configuration of system(s) and/or device(s) that hosts policy enforcer platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host policy enforcer platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with policy enforcer platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of policy enforcer platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Cloud domain 240 includes one or more cloud computing environments similar to cloud computing environment 222. In some implementations, cloud domain 240 may include one or more private cloud domains (e.g., intranets, enterprise cloud domains, and/or the like) that reside in private intranets or data centers managed by private entities, and are protected by a security device (e.g., a firewall). In some implementations, cloud domain 240 may include one or more public cloud domains that reside in public data centers managed by public entities (e.g., cloud service providers). In some implementations, cloud domain 240 may include one or more legacy data center domains that reside in data centers managed by private entities.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
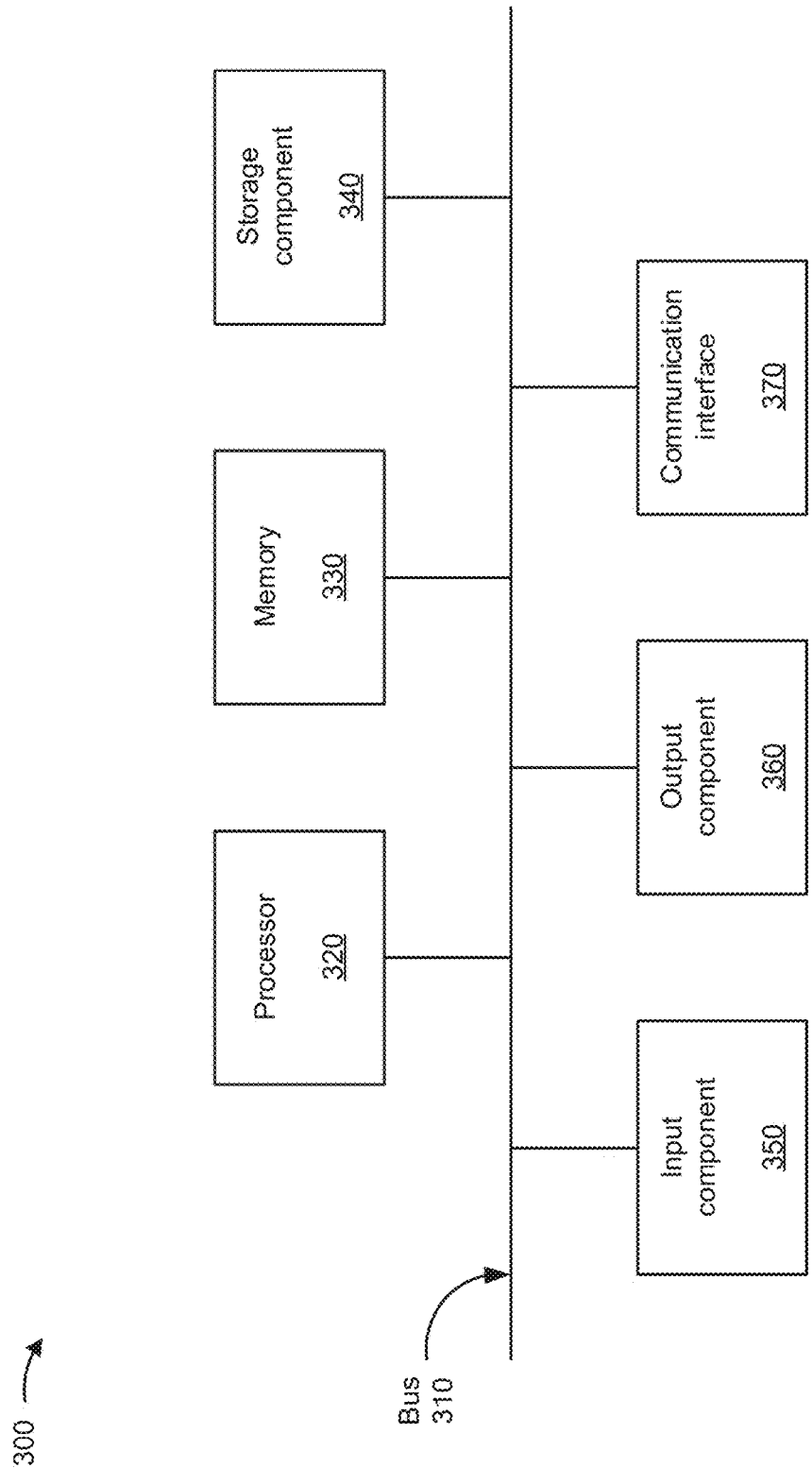
FIG. 3 is a diagram of example components of one or more devices of FIG. 2.

FIG. 3 is a diagram of example components of a device 300. Device 300 may correspond to user device 210, policy enforcer platform 220, and/or computing resource 224. In some implementations, user device 210, policy enforcer platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for enforcing policies in cloud domains with different application nomenclatures. In some implementations, one or more process blocks of FIG. 4 may be performed by a policy enforcer platform (e.g., policy enforcer platform 220). In some implementations, one or more process blocks of FIG. 4 may be performed by another device or a group of devices separate from or including policy enforcer platform 220, such as user device 210.

As shown in FIG. 4, process 400 may include receiving policy information indicating a policy for an application hosted by multiple cloud domains (block 410). For example, the policy enforcer platform (e.g., using computing resource 224, processor 320, communication interface 370, and/or the like) may receive policy information indicating a policy for an application hosted by multiple cloud domains, as described above in connection with FIGS. 1A-2.

As further shown in FIG. 4, process 400 may include receiving, from the multiple cloud domains, different application resource tags and addresses associated with the application (block 420). For example, the policy enforcer platform (e.g., using computing resource 224, processor 320, communication interface 370, and/or the like) may receive, from the multiple cloud domains, different application resource tags and addresses associated with the application, as described above in connection with FIGS. 1A-2.

As further shown in FIG. 4, process 400 may include mapping the different application resource tags to a generic identifier (block 430). For example, the policy enforcer platform (e.g., using computing resource 224, processor 320, and/or the like) may map the different application resource tags to a generic identifier, as described above in connection with FIGS. 1A-2.

As further shown in FIG. 4, process 400 may include associating the policy with the generic identifier and with the addresses associated with the application (block 440). For example, the policy enforcer platform (e.g., using computing resource 224, processor 320, memory 330, storage component 340, and/or the like) may associate the policy with the generic identifier and with the addresses associated with the application, as described above in connection with FIGS. 1A-2.

As further shown in FIG. 4, process 400 may include providing, based on associating the policy with the generic identifier and with the addresses associated with the application, the policy to the multiple cloud domains for implementation (block 450). For example, the policy enforcer platform (e.g., using computing resource 224, processor 320, communication interface 370, and/or the like) may provide, based on associating the policy with the generic identifier and with the addresses associated with the application, the policy to the multiple cloud domains for implementation (e.g., to permit the multiple cloud domains to implement the policy), as described above in connection with FIGS. 1A-2.

As further shown in FIG. 4, process 400 may include receiving, from a particular cloud domain, a new application resource tag and a new address associated with the application (block 460). For example, the policy enforcer platform (e.g., using computing resource 224, processor 320, communication interface 370, and/or the like) may receive, from a particular cloud domain, a new application resource tag and a new address associated with the application, as described above in connection with FIGS. 1A-2.

As further shown in FIG. 4, process 400 may include mapping the new application resource tag to the generic identifier, and associating the policy with the generic identifier and the new address (block 470). For example, the policy enforcer platform (e.g., using computing resource 224, processor 320, memory 330, storage component 340, and/or the like) may map the new application resource tag to the generic identifier, and may associate the policy with the generic identifier and the new address, as described above in connection with FIGS. 1A-2.

As further shown in FIG. 4, process 400 may include providing the policy to the particular cloud domain based on associating the policy with the generic identifier and the new address (block 480). For example, the policy enforcer platform (e.g., using computing resource 224, processor 320, communication interface 370, and/or the like) may provide the policy to the particular cloud domain based on associating the policy with the generic identifier and the new address, as described above in connection with FIGS. 1A-2.

Process 400 may include additional implementations, such as any single implementation or any combination of implementations described below.

In some implementations, the policy enforcer platform may receive, from a cloud domain that is different than the multiple cloud domains, a new application resource tag and a new address associated with the application, may map the new application resource tag to the generic identifier, may associate the policy with the generic identifier and with the new address associated with the application, and may provide the policy to the cloud domain based on associating the policy with the generic identifier and with the new address associated with the application. In some implementations, the policy may include a security policy to be implemented by the multiple cloud domains.

In some implementations, the policy enforcer platform, when associating the policy with the generic identifier and with the addresses associated with the application, may create a policy object that includes a source dynamic address group (DAG) identifier associated with source addresses of the addresses associated with the application, a destination DAG identifier associated with destination addresses of the addresses associated with the application, and information indicating an action to perform based on the policy. In some implementations, the policy enforcer platform, when providing the policy to the multiple cloud domains, may provide the policy object to the multiple cloud domains to permit the multiple cloud domains to perform the action.

In some implementations, the policy enforcer platform may receive, from a cloud domain that is different than the multiple cloud domains, information indicating that the cloud domain does not include the application, and may prevent the policy from being provided to the cloud domain based on determining that the information indicating that the cloud domain does not include the application. In some implementations, the multiple cloud domains may include two or more public cloud domains, two or more private cloud domains, or two or more legacy data center domains.

In some implementations, the application may be migrated from a first cloud domain, of the multiple cloud domains, to a second cloud domain of the multiple cloud domains. In such implementations, the policy enforcer platform may receive, from the first cloud domain, information indicating that another application is associated with the first cloud domain, and may provide another policy to the first cloud domain based on the information indicating that the other application is associated with the first cloud domain. In such implementations, the policy enforcer platform may receive, from the second cloud domain, a new application resource tag and a new address associated with the application, may map the new application resource tag to the generic identifier, may associate the policy with the generic identifier and with the new address associated with the application, and may provide the policy to the second cloud domain based on associating the policy with the generic identifier and with the new address associated with the application.

In some implementations, the policy enforcer platform may receive, from the third cloud domain and after a period of time, a new application resource tag and a new address associated with the application, wherein the new application resource tag and the new address indicate that the application is now hosted in the third cloud domain. In such implementations, the policy enforcer platform may map the new application resource tag to the generic identifier, may associate the policy with the generic identifier and with the new address associated with the application, and may provide, based on associating the policy with the generic identifier and with the new address associated with the application, the policy to the third cloud domain to permit the third cloud domain to implement the policy.

In some implementations, the policy may include a Layer 7 application security policy to be implemented for the application. In some implementations, the policy enforcer platform, when associating the policy with the generic identifier and with the addresses associated with the application, may create a policy object that includes a source dynamic address group (DAG) identifier associated with source addresses of the addresses associated with the application, a destination DAG identifier associated with destination addresses of the addresses associated with the application, and information indicating an action to perform based on the policy. In such implementations, the policy enforcer platform, when providing the policy to the first cloud domain and the second cloud domain, may provide the policy object to the first cloud domain and the second cloud domain to permit the first cloud domain and the second cloud domain to selectively perform the action. In some implementations, each of the first cloud domain, the second cloud, and the third cloud domain includes one of a public cloud domain, a private cloud domain, or a legacy data center domain.

In some implementations, the application may be migrated from the first cloud domain to a fourth cloud domain separate from the first cloud domain. In such implementations, the policy enforcer platform may receive, from the fourth cloud domain, a new application resource tag and a new address associated with the application, may map the new application resource tag to the generic identifier, may associate the policy with the generic identifier and with the new address associated with the application, and may provide the policy to the fourth cloud domain based on associating the policy with the generic identifier and with the new address associated with the application.

In some implementations, the policy enforcer platform may provide a user interface to receive information associated with mapping the different application resource tags to the generic identifier, and may map the different application resource tags to the generic identifier based on the information associated with mapping the different application resource tags to the generic identifier.

In some implementations, the policy enforcer platform, when associating the policy with the generic identifier and with the addresses associated with the application, may create a policy object that includes a source dynamic address group (DAG) identifier associated with source addresses of the addresses associated with the application, a destination DAG identifier associated with destination addresses of the addresses associated with the application, and information indicating a security action to perform based on the policy. In such implementations, the policy enforcer platform, when providing the policy to the private cloud domain and the public cloud domain, may provide the policy object to the private cloud domain and the public cloud domain to permit the private cloud domain and the public cloud domain to perform the security action.

In some implementations, the policy enforcer platform may determine, based on the different application resource tags associated with the application, that one of the private cloud domain or the public cloud domain does not include the application anymore, and may cause the policy to be removed from the one of the private cloud domain or the public cloud domain based on determining that the one of the private cloud domain or the public cloud domain does not include the application.

In some implementations, the policy enforcer platform may receive, from a cloud domain that is different than the private cloud domain and the public cloud domain, a new application resource tag and a new address associated with the application, may map the new application resource tag to the generic identifier, may associate the policy with the generic identifier and with the new address associated with the application, and may provide the policy to the cloud domain based on associating the policy with the generic identifier and with the new address associated with the application. In some implementations, the policy may include a security policy to be implemented for the application in the private cloud domain and the public cloud domain.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a policy enforcer platform that enforces policies in cloud domains with different application nomenclatures. For example, the policy enforcer platform may receive policy information indicating a policy for an application hosted by multiple cloud domains, and may receive, from the multiple cloud domains, different application resource tags and addresses associated with the application. The policy enforcer platform may map the different application resource tags to a generic identifier, and may associate a policy with the generic identifier and with the addresses associated with the application. The policy enforcer platform may provide, based on associating the policy with the generic identifier and with the addresses associated with the application, the policy to the multiple cloud domains to permit the multiple cloud domains to implement the policy.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
receive, from a first cloud domain, a first application resource tag and a first address associated with an application,
process the first application resource tag with a natural language processing technique to determine that the first application resource tag relates to the application;
map the first application resource tag to a generic identifier based on processing the first application resource tag with the natural language processing technique;
receive, from a second cloud domain that is different than the first cloud domain, a second application resource tag and a second address associated with the application;
map the second application resource tag to the generic identifier based on processing the second application resource tag with the natural language processing technique to determine that the second application resource tag relates to the application; and
provide policy information and information indicating an action to at least the first cloud domain and the second cloud domain based on the generic identifier to permit at least the first cloud domain and the second cloud domain to perform the action.

2. The device of claim 1, wherein the one or more processors are further to:
associate a policy with the generic identifier and with the first address associated with the application to create a policy object,
wherein the policy object includes a dynamic address group (DAG) identifier,
wherein the DAG includes:
a source DAG identifier associated with a source address of the first address associated with the application, and a destination DAG identifier associated with destination address of the first address associated with the application.

3. The device of claim 1, wherein the one or more processors are further to:
associate a policy with the generic identifier and with the first address associated with the application to create a policy object,
wherein the policy object includes a dynamic address group (DAG) identifier; and
associate the DAG identifier with the second address identifying the application in the second cloud domain, wherein the second address is an internet protocol (IP) address.

4. The device of claim 1, wherein the one or more processors are further to:
dynamically determine that the application is present in the second cloud domain based on the second application resource tag and the second address associated with the application.

5. The device of claim 1, wherein the one or more processors, when providing the policy information to the second cloud domain based on the generic identifier to permit the second cloud domain to perform the action, are to:
provide the policy information to permit the second cloud domain to perform one or more of the following:
a security action to be applied to the application,
a business action to be applied to the application, or
a network action to be applied to the application.

6. The device of claim 1, wherein the first cloud domain or the second cloud domain includes:
a public cloud domain,
a private cloud domain, or
a legacy data center domain.

7. A non-transitory computer-readable medium storing instructions, the instructions comprising:
one or more instructions that, when executed by one or more processors, cause the one or more processors to:
receive, from a first cloud domain, a first application resource tag and a first address associated with an application,
process the first application resource tag with a natural language processing technique to determine that the first application resource tag relates to the application;
map the first application resource tag to a generic identifier based on processing the first application resource tag with the natural language processing technique;
receive, from a second cloud domain that is different than the first cloud domain, a second application resource tag and a second address associated with the application;
map the second application resource tag to the generic identifier based on processing the second application resource tag with the natural language processing technique to determine that the second application resource tag relates to the application; and
provide policy information and information indicating an action to at least the first cloud domain and the second cloud domain based on the generic identifier to permit at least the first cloud domain and the second cloud domain to perform the action.

8. The non-transitory computer-readable medium of claim 7, wherein the one or more processors are further to:
associate a policy with the generic identifier to create a policy object,
wherein the policy object includes a dynamic address group (DAG) identifier,
wherein the DAG includes:
a source DAG identifier associated with a source address of the first address associated with the application, and
a destination DAG identifier associated with destination address of the first address associated with the application.

9. The non-transitory computer-readable medium of claim 7, wherein the one or more instructions that, when executed by the one or more processors, cause the one or more processors to:

associate a policy with the generic identifier and with the first address associated with the application to create a policy object,
  wherein the policy object includes a dynamic address group (DAG) identifier; and
associate the DAG identifier with the second address identifying the application in the second cloud domain, wherein the second address is an IP address.

10. The non-transitory computer-readable medium of claim 7, wherein the one or more instructions that, when executed by the one or more processors, cause the one or more processors to:
  dynamically determine that the application is present in the second cloud domain based on the second application resource tag and the second address associated with the application.

11. The non-transitory computer-readable medium of claim 7, wherein the one or more instructions that, when executed by the one or more processors, cause the one or more processors to provide the policy information to the second cloud domain based on the generic identifier to permit the second cloud domain to perform the action, cause the one or more processors to:
  provide the policy information to permit the second cloud domain to perform one or more of the following:
    a security action to be applied to the application,
    a business action to be applied to the application, or
    a network action to be applied to the application.

12. The non-transitory computer-readable medium of claim 7, wherein the first cloud domain or the second cloud domain includes:
  a public cloud domain,
  a private cloud domain, or
  a legacy data center domain.

13. A method, comprising:
  receiving, by a device and from a first cloud domain, a first application resource tag associated with an application;
  processing, by the device, the first application resource tag with a natural language processing technique;
  mapping, by the device, the first application resource tag to a generic identifier based on processing the first application resource tag with the natural language processing technique;
  receiving, by the device and from a second cloud domain that is different than the first cloud domain, a second application resource tag associated with the application;
  mapping, by the device, the second application resource tag to the generic identifier based on processing the second application resource tag with the natural language processing technique to determine that the second application resource tag relates to the application; and
  providing, by the device, policy information to at least the first cloud domain and the second cloud domain based on the generic identifier to permit at least the first cloud domain and the second cloud domain to perform an action.

14. The method of claim 13, further comprising:
  associating a policy with the generic identifier to create a policy object,
    wherein the policy object includes a dynamic address group (DAG) identifier,
      wherein the DAG includes:
        a source DAG identifier associated with a source address of ant address associated with the application, and
        a destination DAG identifier associated with destination address of the address associated with the application.

15. The method of claim 13, further comprising:
  associating a policy with the generic identifier to create a policy object,
    wherein the policy object includes a dynamic address group (DAG) identifier; and
  associating the DAG identifier with an address identifying the application in the second cloud domain,
    wherein the address is an IP address.

16. The method of claim 13, further comprising:
  dynamically determining that the application is present in the second cloud domain based on the second application resource tag and an address associated with the application.

17. The method of claim 13, wherein providing the policy information to the second cloud domain based on the generic identifier to permit the second cloud domain to perform the action comprises:
  providing the policy information to permit the second cloud domain to perform one or more of the following:
    a security action to be applied to the application,
    a business action to be applied to the application, or
    a network action to be applied to the application.

18. The method of claim 13, wherein the first cloud domain or the second cloud domain includes:
  a public cloud domain,
  a private cloud domain, or
  a legacy data center domain.

19. The device of claim 1, wherein the application is a first application and the generic identifier is a first generic identifier, and the one or more processors are further to:
  receive a third application resource tag and a third address associated with a second application,
  process the third application resource tag with the natural language processing technique to determine which application resource tags relate to the second application and are to be mapped to a second generic identifier;
  map the third application resource tag to the second generic identifier based on the natural language processing technique;
  receive, from a third cloud domain that is different than the first cloud domain and the second cloud domain, a fourth application resource tag and a fourth address associated with the second application;
  map the fourth application resource tag to the generic identifier based on processing the fourth application resource tag with the natural language processing technique to determine that the fourth application resource tag relates to the second application; and
  provide other policy information and another action to the third cloud domain based on the generic identifier to permit the third cloud domain to perform the other action.

20. The non-transitory computer-readable medium of claim 7, wherein the one or more instructions that, when executed by the one or more processors, cause the one or more processors to:
  provide the policy information to the first cloud domain based on the generic identifier to permit the first cloud domain to perform the action.

* * * * *